US007455093B2

(12) United States Patent
Wu

(10) Patent No.: US 7,455,093 B2
(45) Date of Patent: Nov. 25, 2008

(54) DEVICE FOR MANUFACTURING DOUBLE-FACED CORRUGATED PAPERBOARD

(76) Inventor: Kuan-Shiung Wu, 6F., No. 102, Sec. 2, Meishih Rd., Yangmei Towship, Taoyuan County 326 (TW)

( * ) Notice: Subject to any disclaimer, the term of this patent is extended or adjusted under 35 U.S.C. 154(b) by 396 days.

(21) Appl. No.: 11/327,504

(22) Filed: Jan. 9, 2006

(65) Prior Publication Data

US 2007/0131357 A1 Jun. 14, 2007

(30) Foreign Application Priority Data

Dec. 12, 2005 (TW) .............................. 94221598 U

(51) Int. Cl.
*B32B 37/00* (2006.01)

(52) U.S. Cl. ..................... 156/358; 156/580; 156/583.1

(58) Field of Classification Search ................. 156/470, 156/580, 581, 582, 583.1, 583.5, 358
See application file for complete search history.

(56) References Cited

U.S. PATENT DOCUMENTS 5,910,230 A * 6/1999 Seki et al. .................. 156/470

* cited by examiner

*Primary Examiner*—James Sells
(74) *Attorney, Agent, or Firm*—Leong C. Lei

(57) ABSTRACT

A device for manufacturing double-faced corrugated paperboards is provided, which exerts uniform pressure and enlarge the heated area during the adhesion of a single-faced corrugated paperboard and a liner into a double-faced corrugated paperboard. The device mainly contains a number of flexible, strip-shaped, pressurizing members arranged in parallel along the advancing direction of the paperboard, each of which is suspended by two ore more lifting members which can lower the pressurizing member down to the paperboard and lift the pressurizing member up from the paperboard.

4 Claims, 4 Drawing Sheets

DEVICE FOR MANUFACTURING DOUBLE-FACED CORRUGATED PAPERBOARD

BACKGROUND OF THE INVENTION (a) Technical Field of the Invention

The present invention generally relates to devices for manufacturing corrugated paperboards, and more particularly to a device for exerting uniform pressure during the adhesion process of manufacturing double-faced corrugated paperboards.

(b) Description of the Prior Art

FIG. 1 is a schematic diagram showing a conventional manufacturing device for double-faced corrugated paperboards. As illustrated, adhesive is applied to the corrugated side of a single-faced corrugated paperboard 140 by a glue roll 130 which is driven by a wiper roll 132. Opposite to the glue roll 130, there is a rider roll 134 exerting pressure on the paperboard 140 so that adhesive could be applied uniformly. A liner 142 is then joined to the adhesive-applied corrugated side of the single-faced corrugated paperboard 140, thereby forming a double-sided corrugated paperboard. A rolling device containing a roll 112 and a belt 110 advances the paperboard 140 and the liner 142 by friction to the hot plates 120 to expedite their adhesion. A number of hold-down rolls 114 exert force on the paperboard 140 as it passes to enhance the adhesion effect.

The foregoing process has a number of disadvantages. First, there are only limited, linear, and separate contact areas between the hold-down rolls 114 and the paperboard 140, meaning that the paperboard 140 is not pressurized uniformly. In addition, the problem is worse if the surfaces of the hot plates 120 are not flat enough.

SUMMARY OF THE INVENTION

The primary purpose of the present invention is to provides a device for manufacturing double-faced corrugated paperboard. The major objective of the device is to exert uniform pressure and enlarge the heated area during the adhesion of a single-faced corrugated paperboard and a liner into a double-faced corrugated paperboard.

An aspect of the device is that it contains a plurality of flexible pressurizing members arranged and suspended in parallel along the advancing direction of the paperboard that can be laid down onto the paperboard to provide uniform pressure.

Another aspect of the device is that the pressurizing members are suspended by lifting members that can control the ascending and descending of the pressurizing members in accordance to the size of the paperboard.

Yet another aspect of the device is that the lifting members contain telescoping rods to control the degree of descending of the pressurizing members so as to adjust the pressurized area of the paperboard. Still another aspect of the device is that the lifting members and their telescoping rods are driven by automatic control means.

Still another aspect of the device is that the lifting members and their telescoping rods are driven by automatic control means.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
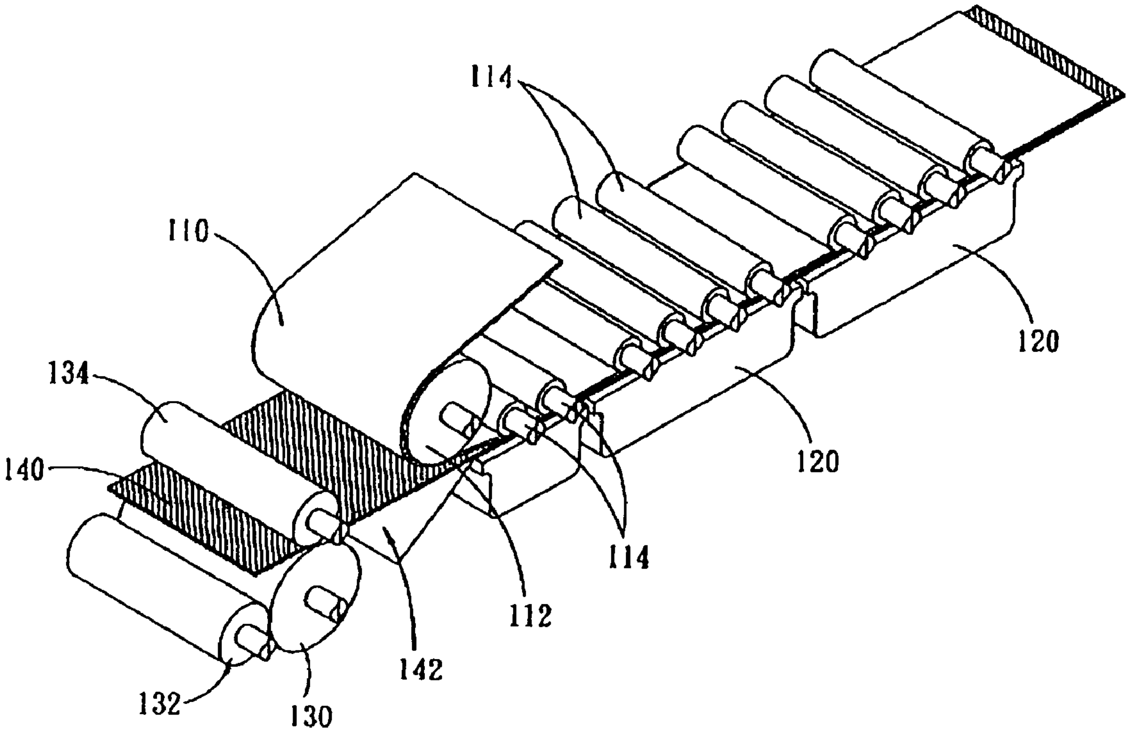
FIG. 1 PRIOR ART
FIG. 1 is a schematic diagram showing a conventional device for manufacturing double-faced corrugated paperboards.
Figure 2:
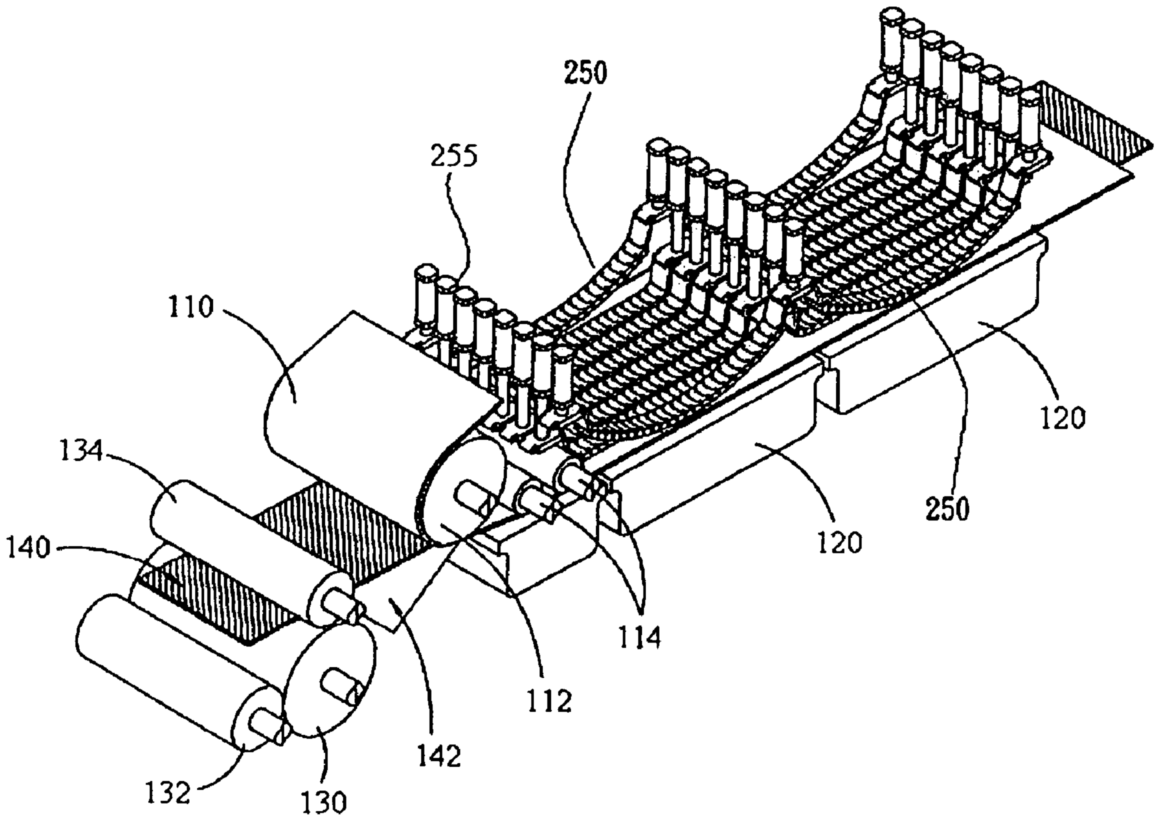
FIG. 2 is a schematic diagram showing a device for manufacturing double-faced corrugated paperboards according to an embodiment of the present invention.

FIG. 2 is a schematic diagram showing a device for manufacturing double-faced corrugated paperboards according to an embodiment of the present invention. As illustrated, a single-faced corrugated paperboard 140 is run through the present embodiment similar to the conventional approaches. Initially, under the pressure exerted by a rider roll 134, adhesive is applied to the corrugated side of the paperboard 140 by a glue roll 130 driven by a wiper roll 132. A liner 142 is then adhered to the corrugated side of the paperboard 140 while they are both advanced to the hot plates 120 to expedite their adhesion by a roll 112 and a belt 110. The present embodiment is configured on top of the non-corrugated side of the paperboard 140 opposite to the hot plates 120. The present embodiment mainly contains a number of flexible, strip-shaped, pressurizing members 250 arranged in parallel along the advancing direction of the paperboard 140 and the liner 142, each of which is suspended by two ore more lifting members 255 which can lower the pressurizing member 250 down on the paperboard 140 and lift the pressurizing member 250 up from the paperboard 140. The pressurizing members 250 are configured such that they cover the entire width of the belt 110 above the hot plates 120. As such, by laying the pressurizing members 250 on top of the paperboard 140, the weight of the pressurizing members 250 jointly provides a highly uniform planar pressure on the paperboard 140 for an enhanced adhesion effect.

Figure 3:
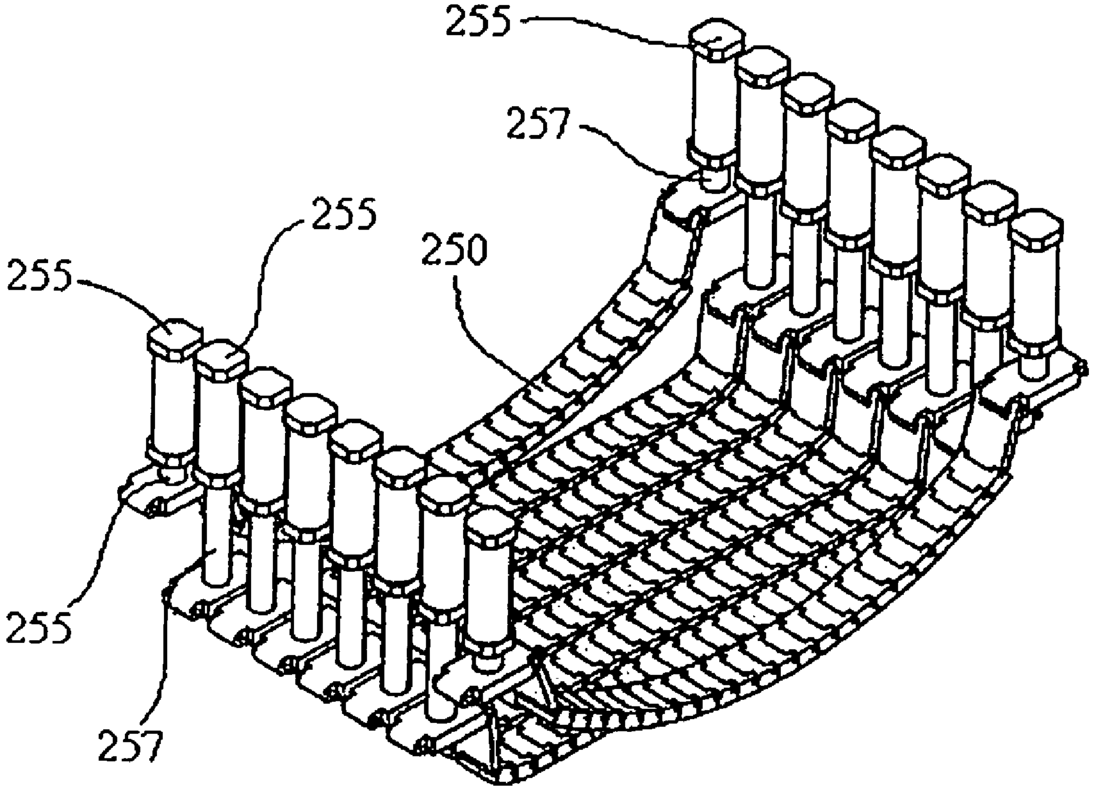
FIG. 3 is a schematic diagram showing the device of FIG. 2 in greater details.

As shown in FIG. 3, each of the lifting members 255 contains a telescoping rod 257 whose bottom end is fixedly attached to a location on a pressurizing member 250. The vertical movement of the rod 257 can be achieved by an appropriate means such as air pressure, hydraulic pressure, or using a shaft or cam. Please note that the strip-like pressurizing members 250 are arranged in parallel along the advancing direction of the belt 110 and the paperboard 140. If the width of the paperboard 140 is smaller, the pressurizing members 250 could be controlled so that only those in the middle of the belt 110 are lowered for exercising pressure to the paperboard 140.

Figure 4A:
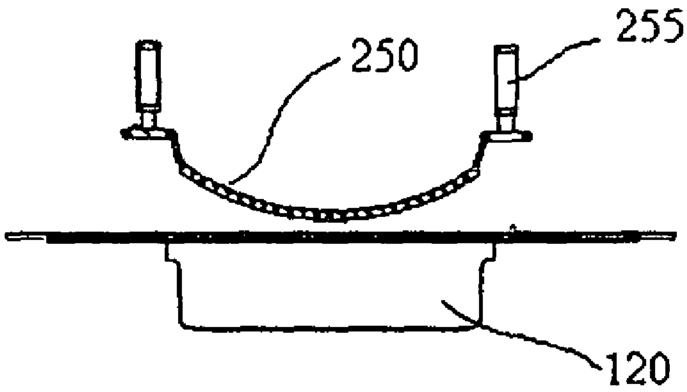
FIGS. 4A, 4B, 4C. shows various operation scenarios of a pressurizing member of FIG. 2.
Figure 4B:
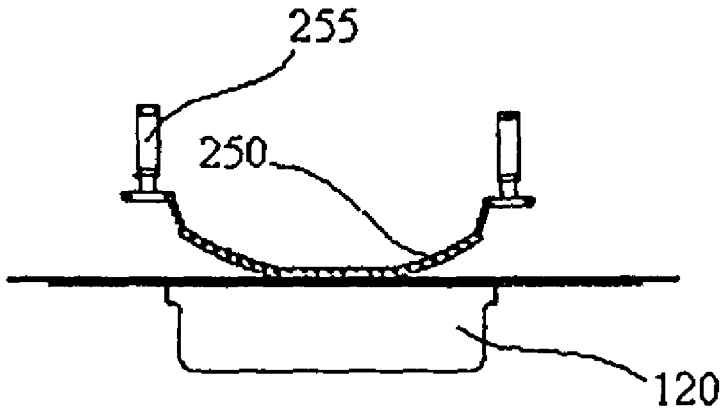
Figure 4C:
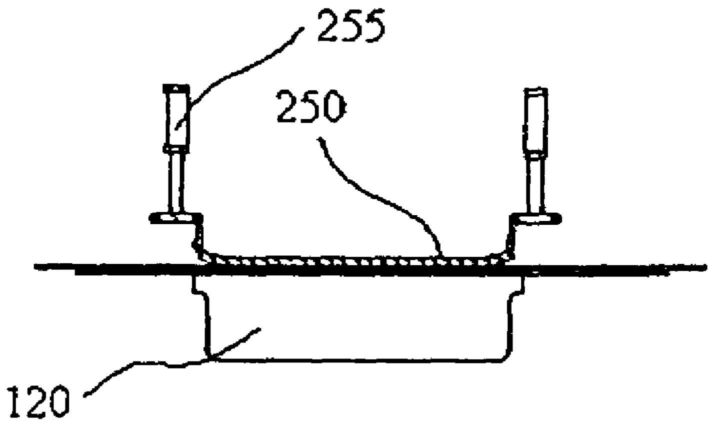

Please also note that an automatic control mechanism could be applied to the control of the lifting members 255 and/or the telescoping rods 257 so that areas of different sizes are pressurized by the pressurizing members 250. As shown in FIGS. 4A, 4B & 4C, in a first scenario shown at the top, a pressurizing member 250 is not lowered down to the paperboard 140, thereby providing no pressure to the paperboard 140 at all. In a second scenario shown in the middle, the pressurizing member 250 is lowered only halfway down to the paperboard 140, thereby providing a smaller force to a smaller area on the paperboard 140. Then, in a third scenario shown at the bottom, the pressurizing member 250 is lowered all the way down to the paperboard 140, thereby providing the greatest force to the largest area on the paperboard 140.

The pressurizing members 250 can be implemented in various ways including, but not limited to, caterpillar bands, steel strips, chains, and cables, as long as they are flexible and can provide appropriate pressure to the paperboard.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A device for enhancing adhesion of a single faced corrugated paperboard whose corrugated side is applied with adhesive and a liner into a double-faced corrugated paperboard when passing over a hot plate beneath said liner during a manufacturing process of said double-faced corrugated paperboard, said device comprising a plurality of flexible pressurizing members and a plurality of lifting members, wherein:

each of said pressurizing members is suspended by two of said lifting members on a top of a non-corrugated side of said single-faced corrugated paperboard opposite to said hot plate;

said pressurizing members are arranged in parallel along advancing direction of said singled-faced corrugated paperboard and said liner;

said pressurizing members are lowered down onto said single-faced corrugated paperboard by said lifting members and weight of said pressurizing members jointly provides uniform pressure to said single-faced corrugated paperboard; and each of said lifting members comprising a telescoping rod whose bottom end is fixedly attached to a location on one of said pressurizing members, and said pressurizing members are lowered down onto said single-faced corrugated paperboard by descending said telescoping rods from said lifting members, degree of descending of each of said telescoping rods is adjusted in accordance with a desired pressurizing area of said single-faced corrugated paperboard.

2. The device according to claim 1, wherein ascending and descending of each of said lifting members is controlled by one of the following means: air pressure, hydraulic pressure, shaft, and cam.

3. The device according to claim 1, wherein ascending and descending of each of said telescoping rods is controlled by one of the following means: air pressure, hydraulic pressure, shaft, and cam.

4. The device according to claim 1, wherein each of said pressurizing members is formed by one of the following: a caterpillar band, a steel strip, a chain, and a cable.

* * * * *